Feb. 24, 1953 R. J. BIDDLESTONE 2,629,186
TIME AND ACTIVITY OCCURRING TIME COMPARING DEVICE
Filed May 22, 1950

INVENTOR.
Rena J. Biddlestone.
BY W. B. Hampman
ATTORNEY.

Patented Feb. 24, 1953

2,629,186

UNITED STATES PATENT OFFICE 2,629,186

TIME AND ACTIVITY OCCURRING TIME COMPARING DEVICE

Rena J. Biddlestone, near Youngstown, Ohio

Application May 22, 1950, Serial No. 163,547

4 Claims. (Cl. 35—39)

This invention relates to instruction devices and more particularly to a device for enabling a child to associate a certain activity with a given time.

The principal object of the invention is the provision of a device providing a representation of several clock dials and means for removably affixing pictures of desired activities adjacent the said clock dial representations to enable a child to associate the clock dial and the setting of the hands thereon with the desired activity.

A further object of the invention is the provision of a device including a clock and several clock dials, each of the clock dials having movable hands and each of the clock dials having an adjacent interchangeable picture of a desired activity to enable a child to associate the pictured activity with the setting of the movable hands on one of the clock dials and to compare the same with the clock to determine whether or not the time for the particular activity has arrived.

A still further object of the invention is the provision of a device for teaching time and including means utilizing the association of various activities with various times so that the said times can be compared and memorized.

The device for teaching time disclosed herein comprises both a practical method of teaching a child to tell time and a toy which may be manipulated by the child. The device combines several clock dials each of which has movable hands with several removable pictures of desired activities. For example, the child's lunch time may be indicated on one of the pictures and the movable hands on the associated clock dial set at 12 o'clock noon. The child then associates the lunch time with the positioning of the hands on the dial and thereby learns to recognize this particular time.

The device also includes a clock so that the child can compare the manually set clock dial indicating lunch time with the clock and thereby determine whether or not the time has arrived. The device includes a number of such dials with manually set hands together with a number of pictures indicating, for example, a certain radio program, bed time, play time, etc. The child is thus enabled to learn to tell time through the association of the desired activity with the preset manually operated clock dials and hands and secondly, to compare the manually operated clock dial and hands with the actual clock.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
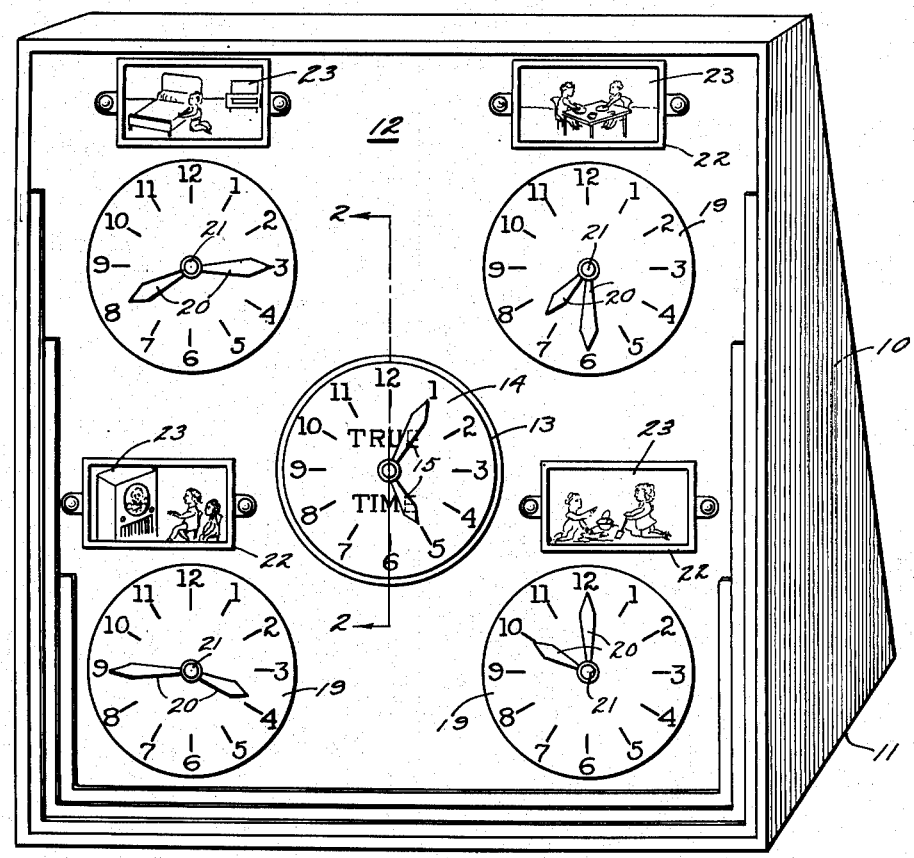
Figure 1 is a perspective view of the time teaching device.
Figure 2:
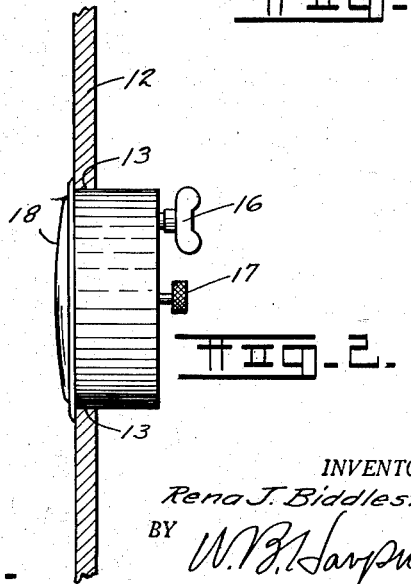
Figure 2 is a vertical section taken on line 2—2 of Figure 1.

By referring to the drawings and Figure 1 in particular it will be seen that a cabinet 10 is disclosed including a base 11 and a front panel 12. The front panel 12 has a central opening 13 in which a clock, including a dial 14 and hands 15, is positioned so as to be visible from the front of the device. The clock positioned in the opening 13 is preferably but not necessarily enclosed in the cabinet 10, as may be seen by referring to Figure 2 of the drawings, the clock includes the usual winding and setting keys 16 and 17, respectively. The dial 14 and the hands 15 are covered with a protective transparent closure 18 which is preferably plastic.

The front panel 12 of the cabinet 10 also includes several representations of clock dials 19—19 such as may be formed thereon by application of an appropriately designed decal thereto. Each of the representations of clock dials 19 has a pair of manually movable hands 20—20 associated therewith and movably secured to the front panel 12 by suitable fasteners 21, the fasteners 21 holding the hands 20—20 under sufficient tension to enable them to retain any desired preset opsitioning.

Each of the representations of clock dials 19 has a card receiving frame 22 positioned adjacent thereto, each of the card receiving frames 22 forming means for removably holding and displaying cards 23 which illustrate a desired activity. For example, the card 23 in the frame 22 in the upper right hand portion of the device illustrates a child eating breakfast while the card 23 in the upper left hand portion of the device illustrates a child going to bed. Other cards may obviously illustrate a child listening to a radio, viewing television, playing on the swings or teeter totter or in the sand box, it being understood that a plurality of such cards indicating many and various activities are supplied with the device and the cards may then be positioned in the frames 22 and the hands 20—20 on the associated dial 19 set to indicate the time at which that activity occurs. Thus, the child can visually associate the clock dial and the hands thereon with the picture of the desired activity and thus learn the positioning of the hands of the clock indicating the particular time of that activity. The child may then compare the hands 15 of the real clock with the present hands 20—20 of the manually set clock to determine when that particular time arrives.

The device therefore teaches time by association; first, the association of the pictured activity with the preset hands 20 on one of the dials 19 and, secondly, the association or comparison of the hands 20 on the dial 19 indicating the time of the desired activity with the real clock and its hands 15 indicating the correct time on the dial 14.

Figure 3:
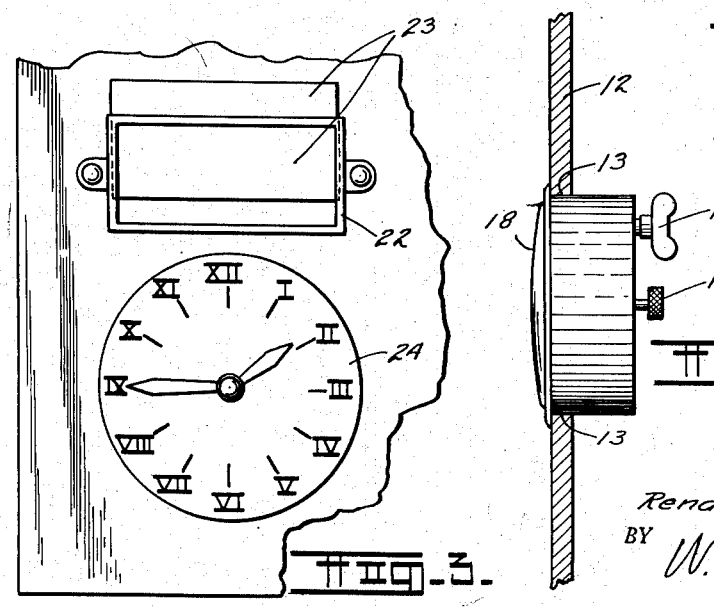
Figure 3 is a plan view of a portion of the time teaching device shown in Figure 1 and showing a modified dial.

The device may also be used to teach a child to tell time on a clock having Roman numerals and in order that this may be accomplished, a replaceable dial 24 is supplied as illustrated in Figure 3 of the drawings and which dial 24 may be positioned on the front panel 12, and used by the child in the same manner as the dials 19—19 heretofore referred to so that the child learns to associate the Roman numerals with the Arabic numerals on the dial 14.

It will thus be seen that a time teaching device has been disclosed which may be advantageously used in teaching a child to tell time and more importantly may be preset to several different times indicating several different activities so that the child can determine for itself the time at which these activities occur and eliminate the necessity of asking the parent as to when the activity will occur. The invention disclosed herein thereby meets the several objects of the invention.

Having thus described my invention, what I claim is:

1. A time and activity time comparing device including a supporting panel and a plurality of identical clock dials positioned thereon, each of the clock dials having identical movable hands thereon and a clock works for driving the movable hands on one of the clock dials, a removable picture of an activity positioned adjacent each of the other clock dials.

2. A time and activity time comparing device comprising a body member having a clock positioned therein and visible from the front thereof, the said clock including the usual clock works, dial and hands indicating the actual time, a plurality of secondary clock dials on said body member adjacent the said clock, clock hands on each of said secondary clock dials and an illustration of a particular activity in association with each of said secondary clock dials, the clock hands on each of the secondary clock dials indicating the time of the occurrence of the associated illustrated activity whereby visual comparison of said clock dial and hands indicating the actual time and the secondary clock dials and hands indicating the time of occurrence of the associated illustrated activity may be made.

3. The time and activity time comparing device set forth in claim 2 wherein the illustrations of the activities take the form of interchangeable cards.

4. A time and activity occurring time comparing device comprising a body member having a clock positioned therein and visible from the front thereof, the said clock including the usual clock works, dial and hands indicating the actual time, the clock dial having Arabic numerals thereon, a plurality of secondary clock dials on the said body member adjacent the said clock, at least one of the said secondary clock dials having Roman numerals thereon, clock hands on each of the secondary clock dials and an illustration of a particular activity associated with each of the secondary clock dials, the clock hands on each of the secondary clock dials indicating the time of the occurrence of the illustrated activity associated therewith whereby visual indication of the difference between the said clock dial and hands and any one of the secondary clock dial and hands may be seen.

RENA J. BIDDLESTONE.

REFERENCES CITED

The following references are of record in the file of this patent:

UNITED STATES PATENTS

| Number | Name | Date |
|---|---|---|
| D. 146,757 | Webb | May 6, 1947 |
| D. 149,106 | Berman | Mar. 30, 1948 |
| 696,690 | Murray | Apr. 1, 1902 |
| 1,276,344 | Gilman | Aug. 20, 1918 |
| 2,305,283 | Theilkas | Dec. 15, 1942 |
| 2,493,138 | Hathaway | Jan. 3, 1950 |